(12) United States Patent
Shrivastava et al.

(10) Patent No.: US 9,036,728 B2
(45) Date of Patent: *May 19, 2015

(54) GROUP RESOURCE ALLOCATION TECHNIQUES FOR IEEE 802.16M (71) Applicant: Intel Corporation, Santa Clara, CA (US)

(72) Inventors: Shweta Shrivastava, Beaverton, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 13/735,905

(22) Filed: Jan. 7, 2013

(65) Prior Publication Data
US 2013/0121234 A1    May 16, 2013

Related U.S. Application Data (62) Division of application No. 12/651,338, filed on Dec. 31, 2009, now Pat. No. 8,351,533.

(60) Provisional application No. 61/170,072, filed on Apr. 16, 2009, provisional application No. 61/173,204, filed on Apr. 28, 2009.

(51) Int. Cl.
| *H04B 7/02* | (2006.01) |
| *H04W 72/00* | (2009.01) |
| *H04L 5/00* | (2006.01) |
| *H04W 72/12* | (2009.01) |
| *H04W 4/06* | (2009.01) |

(Continued)

(52) U.S. Cl.
CPC ............ *H04W 72/005* (2013.01); *H04L 5/0091* (2013.01); *H04W 4/06* (2013.01); *H04W 72/04* (2013.01); *H04W 72/042* (2013.01); *H04W 72/121* (2013.01); *H04W 72/1289* (2013.01); *H04W 84/12* (2013.01)

(58) Field of Classification Search
USPC ........................................................ 375/267
See application file for complete search history.

(56) References Cited

U.S. PATENT DOCUMENTS 7,627,286 B2 * 12/2009 Webster et al. ............... 455/13.3
7,916,670 B2 *  3/2011 Trainin et al. ................. 370/282

(Continued)

OTHER PUBLICATIONS

"U.S. Appl. No. 12/651,338, Non Final Office Action mailed Apr. 3, 2012", 11 pgs.

(Continued)

*Primary Examiner* — Santiago Garcia
(74) *Attorney, Agent, or Firm* — Schwegman Lundberg & Woessner, P.A.; Eric S. Hiponia (57) ABSTRACT

Group resource allocation techniques for IEEE 802.16m are generally presented. In this regard a method is introduced comprising generating a plurality of bitmaps to identify resource allocations and multiple input multiple output (MIMO) modes for a group of broadband wireless mobile stations, wherein each mobile station in the group is assigned a position within a user bitmap to identify whether the mobile station is allocated frame resources and wherein the position within one or more MIMO bitmap(s) to identify a MIMO mode, and transmitting the bitmaps in a group resource allocation (GRA) information element (IE) of a broadband wireless media access protocol (MAP) frame portion. Other embodiments are also disclosed and claimed.

18 Claims, 9 Drawing Sheets

(51) Int. Cl.
*H04W 72/04* (2009.01)
*H04W 84/12* (2009.01)

(56) References Cited

U.S. PATENT DOCUMENTS

| | | | | |
|---|---|---|---|---|
| 8,050,701 | B2* | 11/2011 | Gorokhov et al. | 455/522 |
| 8,351,533 | B2 | 1/2013 | Shrivastava et al. | |
| 2006/0270352 | A1* | 11/2006 | Webster et al. | 455/63.4 |
| 2007/0002810 | A1* | 1/2007 | Trainin et al. | 370/338 |
| 2008/0310528 | A1* | 12/2008 | Soong et al. | 375/260 |
| 2009/0022098 | A1* | 1/2009 | Novak et al. | 370/329 |
| 2009/0147880 | A1* | 6/2009 | Wennstrom et al. | 375/267 |
| 2010/0220683 | A1* | 9/2010 | Novak et al. | 370/330 |
| 2010/0266057 | A1 | 10/2010 | Shrivastava et al. | |
| 2011/0150004 | A1* | 6/2011 | Denteneer et al. | 370/476 |
| 2012/0039288 | A1* | 2/2012 | Kim et al. | 370/329 |

OTHER PUBLICATIONS

"U.S. Appl. No. 12/651,338, Notice of Allowance mailed Sep. 10, 2012", 7 pgs.

"U.S. Appl. No. 12/651,338, Preliminary Amendment filed Mar. 31, 2010", 8 pgs.

"U.S. Appl. No. 12/651,338, Response filed Jul. 3, 2012 to Non Final Office Action mailed Apr. 3, 2012", 14 pgs.

\* cited by examiner

GROUP RESOURCE ALLOCATION TECHNIQUES FOR IEEE 802.16M

CLAIM OF PRIORITY

The present application is a divisional of U.S. patent application Ser. No. 12/651,338, filed on Dec. 31, 2009, which claims priority to U.S. provisional application Ser. No. 61/173,204, filed on Apr. 28, 2009, and to U.S. Provisional Patent Application Ser. No. 61/170,072, filed on Apr. 16, 2009, which are incorporated herein by reference in their entireties.

FIELD OF THE INVENTION

Embodiments of the present invention may relate to the field of broadband wireless networks, and more specifically to group resource allocation techniques for IEEE 802.16m.

BACKGROUND OF THE INVENTION

In a broadband wireless network, such as IEEE 802.16 wireless networks, access to the network may be scheduled with resource allocations communicated by base stations to mobile stations on a frame by frame basis. The overhead of communicating resource allocations may be reduced by logically grouping mobile stations and communicating resource allocations for users within the group concurrently. Typically, however, group resource allocations are limited to groupings of mobile stations operating in a same mode, for example a same multiple input multiple output (MIMO) mode.

BRIEF DESCRIPTION OF THE DRAWING

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the drawings have not necessarily been drawn accurately or to scale. For example, the dimensions of some of the elements may be exaggerated relative to other elements for clarity or several physical components included in one fractional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. However it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

While the following detailed description may describe various embodiments of the present invention in relation to wireless networks utilising orthogonal frequency division multiplexing (OFDM) modulation, the embodiments of present invention are not limited thereto and, for example, may be implemented using other modulation and/or coding schemes where suitably applicable. Further, while example embodiments are described herein in relation to wireless metropolitan area networks (WMANs), the invention is not limited thereto and can be applied to other types of wireless networks where similar advantages may be obtained. Such networks specifically include, but are not limited to, wireless local area networks (WLANs), wireless personal, area networks (WPANs), and/or wireless wide area networks (WWANs).

The following inventive embodiments may be used in a variety of applications including transmitters and receivers of a radio system, although the present invention is not limited in this respect. Radio systems specifically included within the scope of the present invention include, but are not limited to, network interface cards (NICs), network adaptors, mobile stations, base stations, access points (APs), gateways, bridges, hubs and cellular radiotelephones. Further, the radio systems within the scope of the invention may include cellular radiotelephone systems, satellite systems, personal communication systems (PCS), two-way radio systems, two-way pagers, personal computers (PCs) and related peripherals, personal digital, assistants (PDAs), personal computing accessories and all existing and future arising systems which may be related in nature and to which the principles of the inventive embodiments could be suitably applied.

Figure 1:
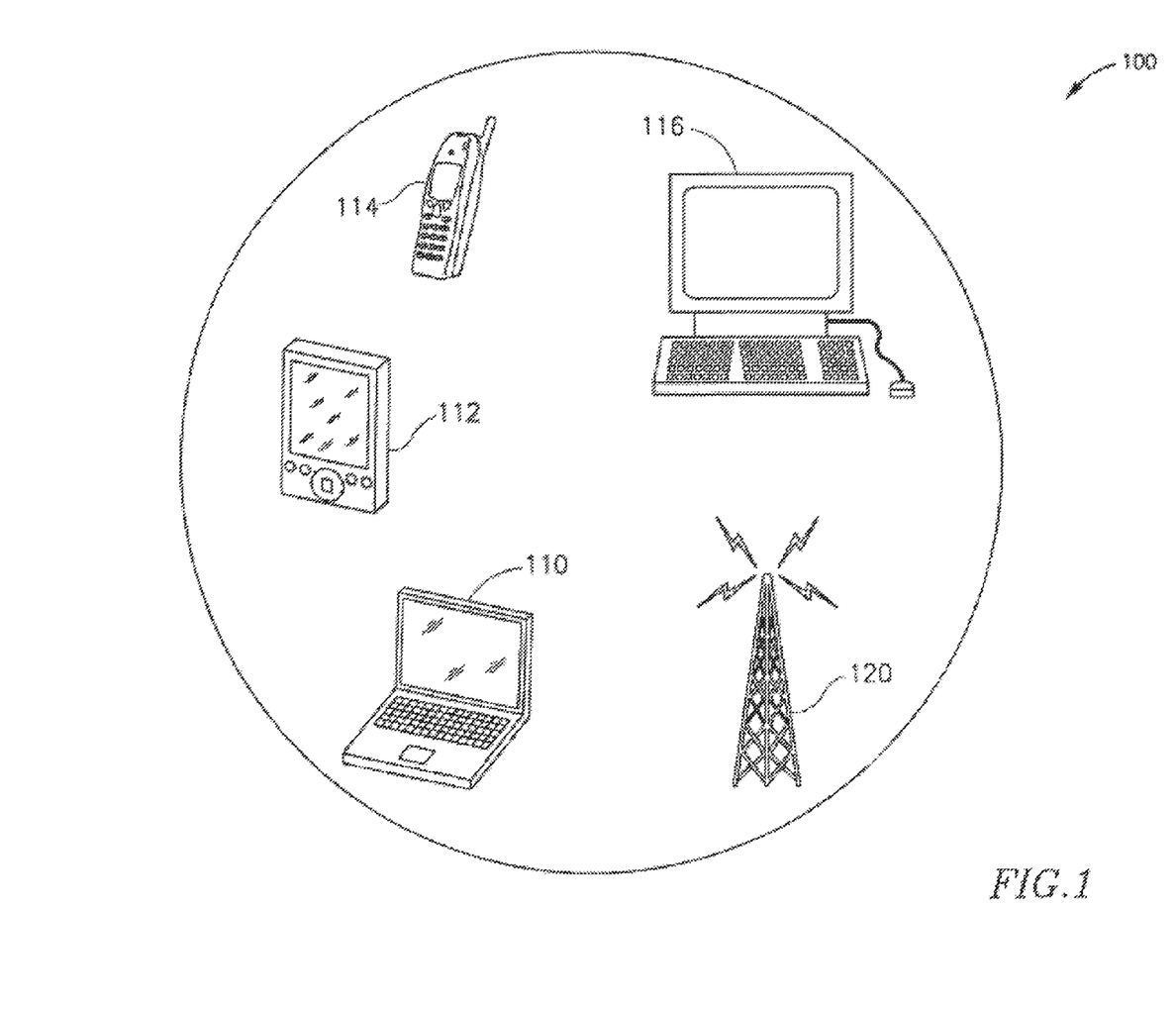
FIG. 1 is a schematic illustration of a wireless network according to an embodiment of the present invention.

Reference is made to FIG. 1, which schematically illustrates a wireless network 100 according to an embodiment of the present invention. Wireless network 100 may include provider network (PN) 120, a base station (BS) 118, and one or more subscriber or other stations 110, 112, 114, and/or 116, which may be for example mobile or fixed subscriber stations. In some embodiments, base station 118, for example, in WLANs, may be referred to as an access point (AP), terminal and/or node, and subscriber stations 110, 112, 114, and/or 116 may be referred to as a station (STA), terminal, and/or node. However, the terms base station and subscriber station are used merely as an example throughout this specification and their denotation in this respect is in no way intended to limit the inventive embodiments to any particular type of network or protocols.

Wireless network 100 may facilitate wireless access between each of subscriber stations 110, 112, 114, and/or 116 and PN 120. For example, wireless network 100 may be configured to use one or more protocols specified in by the Institute of Electrical and Electronics Engineers (IEEE) 802.11™ standards ("IEEE Standard for Wireless LAN Medium Access Control (MAC) and Physical Layer (PHY) Specification. 1999 Edition", reaffirmed Jun. 12, 2003), such as IEEE 802.11a™-1999; IEEE 802.11b™-1999/Cor1-2001; IEEE 802.11g™-2003; and/or IEEE 802.11n™, in the IEEE 802.16™ standards ("IEEE Standard for Local and Metropolitan Area Networks—Part 16: Air Interface for Fixed Broadband Wireless Access System", Oct. 1, 2004), such as IEEE 802.16-2004/Cor1-2005 or IEEE Std 802.16-2009, which may herein be referred, to as the "IEEE Std 802.16-2009" or "WiMAX" standards, and/or in the IEEE 802.15.1™ standards ("IEEE Standard for Local and Metropolitan Area Networks—Specific Requirements, Part 15.1: Wireless Medium Access Control (MAC) and Physical Layer (PHY) Specifications for Wireless Personal Area Networks (WPANs™)", Jun. 14, 2005), although the invention is not limited in this respect and other standards may be used. In some embodiments, attributes, compatibility, and/or functionality of wireless network 100 and components thereof may be defined according to, for example, the IEEE 802.16 standards (e.g., which may be referred to as a worldwide interoperability for microwave access (WiMAX)). Alternatively or in addition, wireless network 100 may use devices and/or protocols that may be compatible with a $3^{rd}$ Generation Partnership Project (3GPP) Long Term Evolution (LTE) cellular network or any protocols for WPAMs or WWANs.

Embodiments of the invention may enable the next generation of mobile WiMAX systems (e.g., based on IEEE 802.16m standard) to efficiently support substantially high mobility and low latency applications, such as, for example, Voice-over-Internet Protocol (VoIP), interactive gaming over the air-interface, deployment in larger cell-sizes or lower frequency bands, and/or "multi-hop" relay operations.

In some embodiments, base station 118 may manage and/or control wireless communications among subscriber stations 110, 112, 114, and/of 116 and between subscriber stations 110, 112, 114, and/or 116 and provider network 120. Subscriber stations 110, 112, 114, and/or 116 may, in turn, facilitate various service connections of other devices (not shown) to wireless network 100 via a private or public local area network (LAN), although the embodiments are not limited in this respect.

Figure 2:
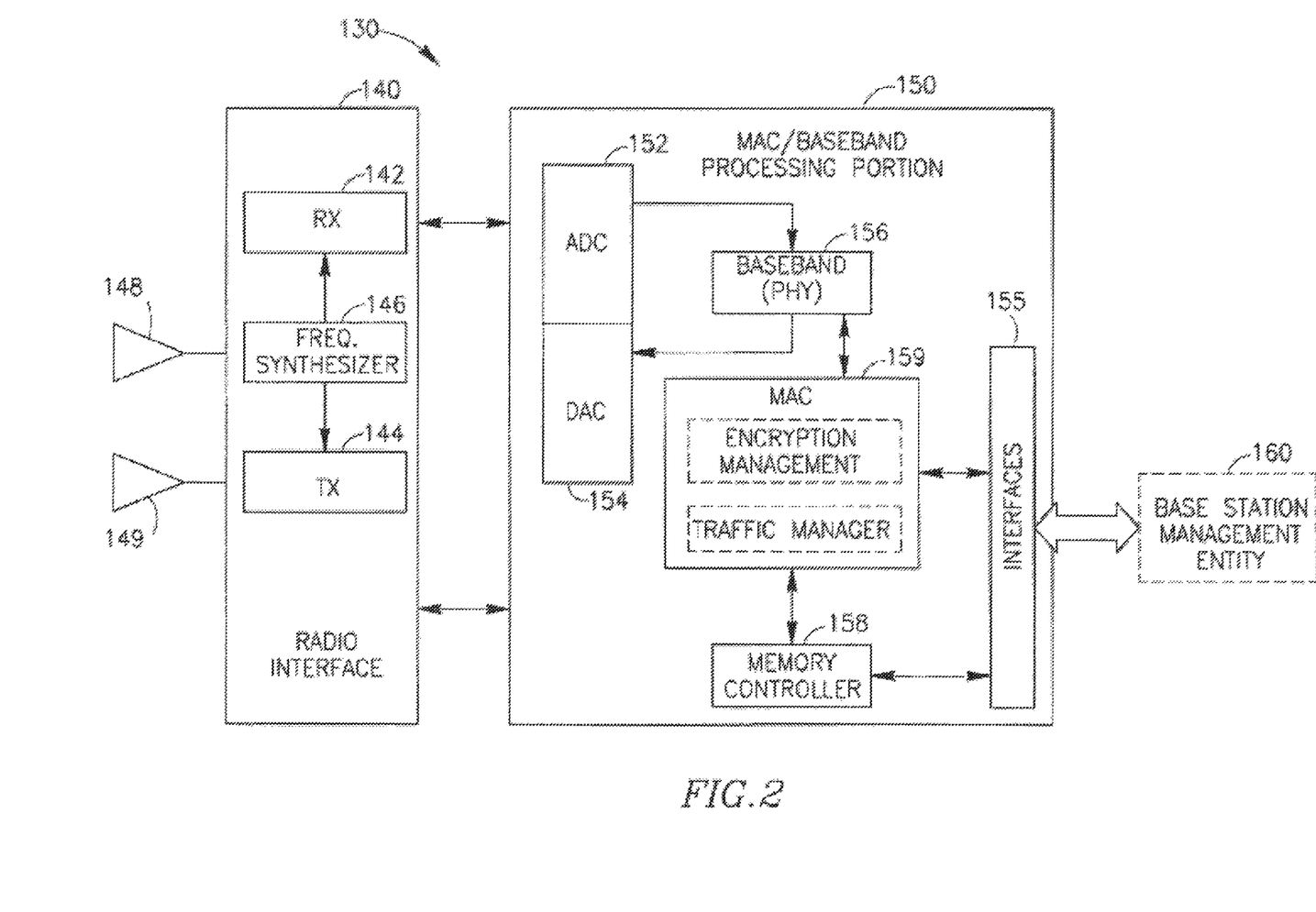
FIG. 2 is a schematic illustration of an apparatus for use in a wireless network according to an embodiment of the present invention.

Reference is made to FIG. 2, which schematically illustrates an apparatus 130 for use in a wireless network according to an embodiment of the invention. For example, apparatus 130 may be a terminal, device, or node (e.g., one of subscriber stations 110, 112, 114, and/or 116, base station 118, and/or provider network 120, described in FIG. 1) for communicating with other terminals, devices, or nodes, in a wireless network (e.g., wireless network 100, described in FIG. 1). Apparatus 130 may include a controller or processing circuit 150 including logic (e.g., including hard circuitry, processor and software, or a combination thereof) to determine the false frame detection rate and/or adjust the sensitivity of frame detection as described in one or more embodiments of the invention. In some embodiments, apparatus 130 may include a radio frequency (RF) interface 140 and/or a medium access controller (MAC)/baseband processor circuit 150.

In one embodiment, RF interface 140 may include a component or combination of components adapted for transmitting and/or receiving single carrier or multi-carrier modulated signals (e.g., including complementary code keying (CCK) and/or orthogonal frequency division multiplexing (OFDM) symbols) although the inventive embodiments are not limited to any specific over-the-air interface or modulation scheme. RF interface 140 may include, for example, a receiver 142, a transmitter 144 and/or a frequency synthesizer 146. Interface 140 may include bias controls, a crystal oscillator and/or one or more antennas 148 and/or 149. In another embodiment, RF interface 140 may use external voltage-controlled oscillators (VCOs), surface acoustic wave filters, intermediate frequency (IF) filters and/or RF filters, as desired. Due to the variety of potential RF interface designs an expansive description thereof is omitted.

Processing circuit 150 may communicate with RF interlace 140 to process receive and/or transmit signals and may include, for example, an analog-to-digital converter 152 for down converting received signals, a digital-to-analog converter 154 for up converting signals for transmission. Further, processor circuit 150 may include a baseband or physical layer (PHY) processing circuit 156 for PHY link layer processing of respective receive/transmit signals. Processing circuit 150 may include, for example, a processing circuit 159 for medium access control (MAC)/data link layer processing. Processing circuit 150 may include a memory controller 158 for communicating with processing circuit 159 and/or a base station management entity 160, for example, via interfaces 155.

In some embodiments of the present invention, PHY processing circuit 156 may include a frame construction and/or detection module, in combination with additional circuitry such as a buffer memory, to construct and/or deconstruct super-frames as in the embodiments previously described. Alternatively or in addition, MAC processing circuit 159 may share processing for certain of these functions or perform these processes independent of PHY processing circuit 150. In some embodiments, MAC and PHY processing may be integrated into a single circuit if desired.

Apparatus 130 may be, for example, a base station, an access point, a subscriber station, a device, a terminal, a node, a hybrid coordinator, a wireless router, a NIC and/or network adaptor for computing devices, a mobile station or other device suitable to implement the inventive methods, protocols and/or architectures described herein. Accordingly, functions and/or specific configurations of apparatus 130 described herein, may be included or omitted in various embodiments of apparatus 130, as suitably desired. In some embodiments, apparatus 130 may be configured to be compatible with protocols and frequencies associated one or more of the IEEE 802.11, 802.15 and/or 802.16 standards for WLANs, WPANs and/or broadband wireless networks, cited herein, although the embodiments are not limited in this respect.

Embodiments of apparatus 130 may be implemented using single input single output (SISO) architectures. However, as shown in FIG. 2, certain implementations may include multiple antennas (e.g., antennas 148 and 149) for transmission and/or reception using adaptive antenna, techniques for beamforming or spatial division multiple access (SDMA) and/or using multiple input multiple output (MIMO) communication techniques.

The components and features of station 130 may be implemented using any combination of discrete circuitry, application specific integrated circuits (ASICs), logic gates and/or single chip architectures. Further, the features of apparatus 130 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example apparatus 130 shown in the block diagram of FIG. 2 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments of the present invention.

Figure 3:
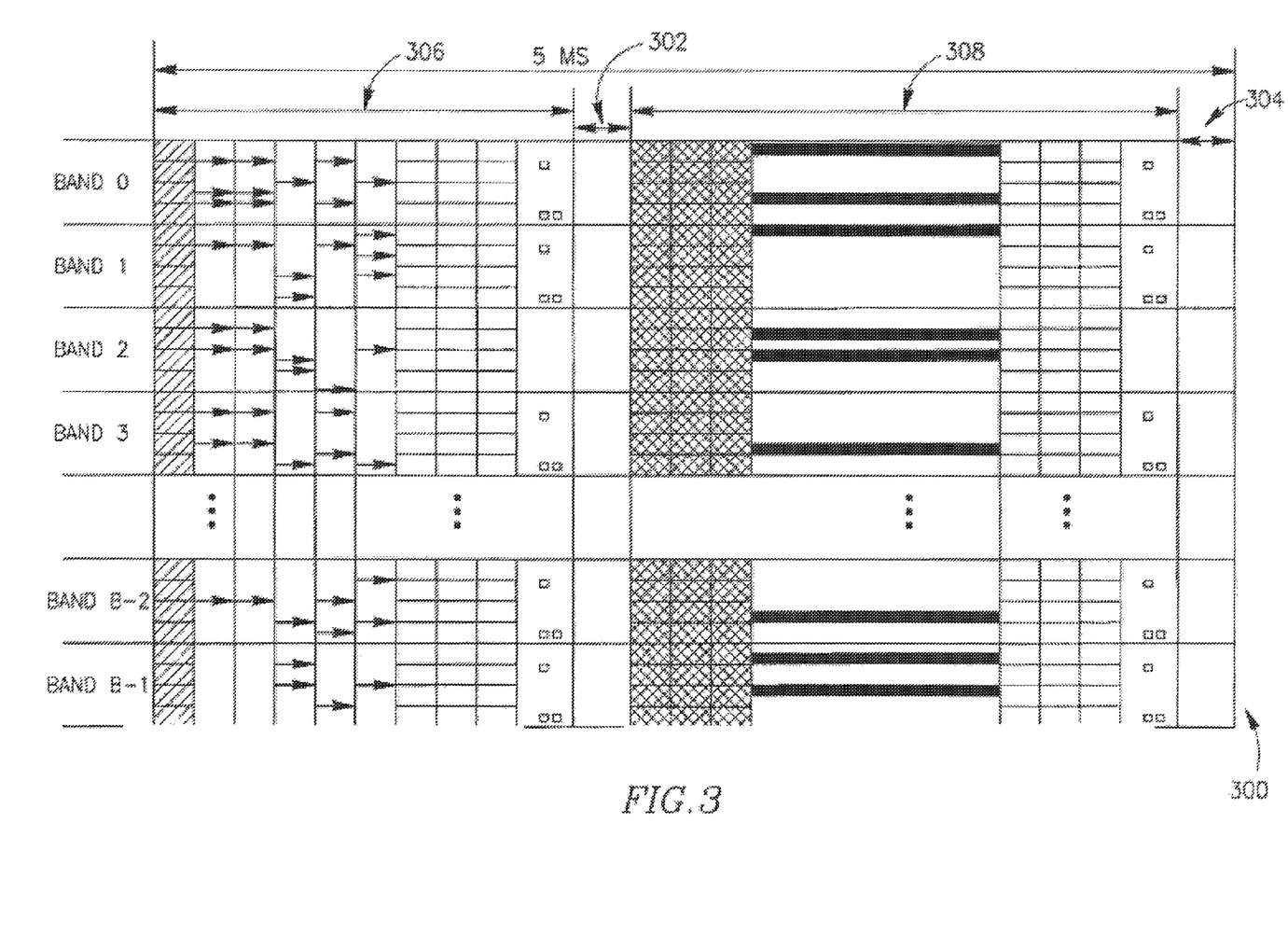
FIG. 3 is a schematic illustration of a frame structure according to an embodiment of the present invention.

Reference is made to FIG. 3, which schematically illustrates a frame 300 structure according to an embodiment of the present invention. Frame 300 (e.g., a radio frame) may be a portion of a transmitted and/or received communication in, for example, wireless network 100. In some embodiments, frame 300 may describe a periodically repeating segment structure of a larger communication, signal or stream. In some embodiments, repeating frame 300 may include substantially different information, for example, during substantially each separate transmission. Frame 300 may be defined and may include broadband wireless access technology according to, for example, the IEEE Std 802.16-2009 or mobile WiMAX profiles. According to the mobile WiMAX profiles, the duration of frame 300 or transmission time interval (TTI) may be, for example, approximately 5 ms. Other frame or radio frame sizes such as for example 2, 2.5, 4, 8, 10, 12, and 20 ms may be used as for example specified in the IEEE Std 802.16-2009 specification.

In some embodiments, frame 300 may be transmitted and/or received, for example, according to a time division duplex (TDD) mode or scheme. Other time and/or frequency schemes may be used (e.g., such as a frequency division duplex (FDD) mode or scheme) according to embodiments of the invention.

Frame 300 may include an integer number of OFDM symbols or other multiplexing symbols. The number of OFDM symbols per frame may be determined, for example, according to a choice of OFDM numerology (e.g., sub-carrier spacing, cyclic prefix length, sampling frequency, etc.). In some embodiments, OFDM numerologies may be determined, set, or obtained, for example, depending, on a bandwidth and sampling frequency (e.g., or an over-sampling factor according to the mobile WiMAX profiles). In various embodiments, substantially different OFDM numerologies may be used, which may result in substantially different number of OFDM symbols in frame 300.

In some embodiments, frame 300 may include idle symbols and/or idle time slots. In one embodiment, frame 300 may include one or more switching periods 302 and/or 304, for example, for changing between a pre-designated downlink (DL) transmission 306 and a pre-designated uplink (UL) transmission 308 when a TDD duplex mode or scheme is used. In other embodiments, for example, when an FDD duplex scheme is used, since DL transmissions 306 and UL transmissions 308 may be sent substantially at the same or overlapping times (e.g., over different frequencies or network channels) frame 300 may include substantially few or no idle symbols, idle time slots, and/or switching periods 302 and/or 304.

In some embodiments, the TTI or the duration of frame 300 may be, for example, approximately 5 ms. A round trip time (RTT) (e.g., the time interval between two consecutive pre-scheduled DL transmissions 306 to a specific wireless node may be, for example, approximately 10 ms. Wireless networks (e.g., wireless network 100) having rapidly changing channel conditions and/or small coherence times (e.g., rapidly moving mobile stations or nodes, such as automobiles having vehicular speeds of, for example. In the excess of approximately 120 kilometers per hour (km/h)) may use mechanisms for supporting substantially high mobility in varying channel conditions. Embodiments of the invention may support wireless network 100 having substantially small round trip times, for example, to enable substantially fast-varying channel condition feedback between subscriber stations 110, 112, 114, and/or 116, such as a mobile station, and base station 118. Other time durations may be used.

The current IEEE Std 802.16-2009 specification standard frame structure may include restrictions, such as substantially long TTIs that are typically not suitable for supporting substantially fast feedback and low access latency (e.g., less than 10 ms), which may be used by, for example, emerging radio access technologies.

Embodiments of the present invention may include or use a modified version of the frame 300 structure for supporting lower latency operations, while maintaining backward compatibility, for example, to the IEEE Std 802.16-2009 specification frame structure. Frame 300 structure may be used, for example, in the next generation of mobile WiMAX systems and devices (e.g., including the IEEE 802.16m standard). In some embodiments, frame 300 structure or portions thereof may be transparent to the legacy terminals (e.g., which operate according to mobile WiMAX profiles and IEEE Std 802.16-2009) and may be used only for communication between BSs, subscriber stations, and/or MSs that both operate based, on the IEEE 802.16m standard.

According to embodiments of the invention, the frame structure may include synchronization and broadcast channels and the mobile stations may have to parse or decode the common control channel (e.g., media access protocol (MAP) frame portion) for acquiring system configuration information to determine uplink (UL) and downlink (DL) allocations.

Figure 4:
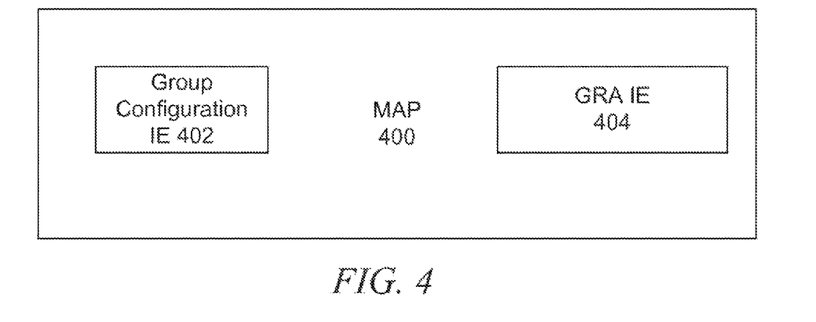
FIG. 4 is a schematic illustration of a media access protocol (MAP) frame portion according to an embodiment of the present invention.

Reference is made to FIG. 4, which is a schematic illustration of a media access protocol (MAP) frame portion according to an embodiment of the present invention. MAP 400 may be part of a frame 300 and may contain configuration information and resource allocations. As shown, MAP 400 may include group configuration, information element (IE) 402 and group resource allocation (GRA) IE 404. Group configuration IE 402 may be used to inform a user (mobile station) that it has been added to a group. This IE is a unicast IE and is sent to a user when it is being added to a new group. Group configuration IE 402 may communicate an index or position within a user bitmap assigned to a mobile station.

GRA IE 404 may be used to allocate resources to the users of a group. This IE is transmitted periodically and signals the resource allocation parameters for users of the group. The GRA IE 404 may include any combination of bitmaps presented hereinafter.

Figure 5:
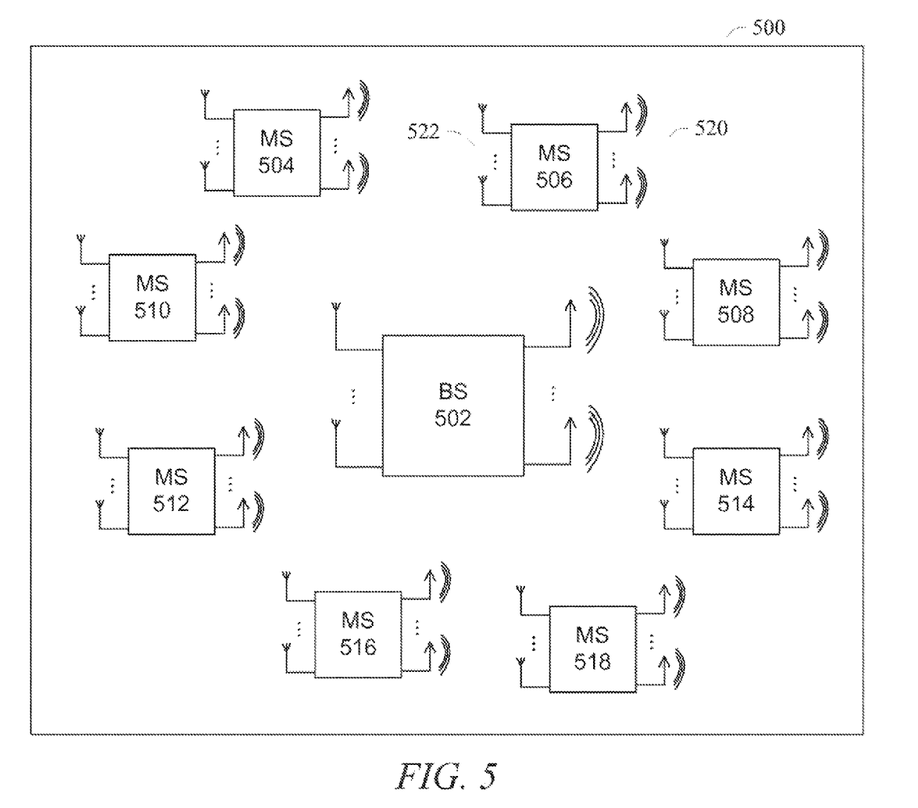
FIG. 5 is a schematic illustration of a wireless network according to an embodiment of the present invention.

Reference is made to FIG. 5, which is a schematic illustration of a wireless network according to an embodiment of the present invention. Wireless network 500 may include base station 502 and mobile stations 504-518. Each mobile station may include transmit antennas 520 and receive antennas 522 to be able to operate in a multiple input multiple output MIMO mode. In one embodiment, mobile stations have two transmit antennas 520 and two receive antennas 522. In another embodiment, mobile stations have four transmit antennas 520 and four receive antennas 522. While in other embodiments mobile stations in network 500 may have varying and disparate numbers of transmit antennas 520 and receive antennas 522.

Base station 502 may group some or all of mobile stations 504-518 into one or more groups for GRA purposes. BS 502 may add a user to a group by transmitting the group configuration IE (402) which may signal any or all of the following information to the user: a group ID of the group to which the user is added, a user's index in the group's user bitmap, a modulation and coding scheme (MCS) range corresponding to the group, a MIMO mode set corresponding to the group, and a hybrid automatic repeat request (HARQ) burst size set corresponding to the group.

BS 502 may generate a plurality of bitmaps (for example as shown hereinafter) to identify resource allocations and MIMO modes for a group of broadband wireless mobile stations, wherein each mobile station in the group is assigned a position within a user bitmap to identify whether the mobile station is allocated frame resources and wherein the position within one or more MIMO bitmap(s) to identify a MIMO mode. BS 502 may transmit the bitmaps in a GRA IE of a MAP frame portion.

When a mobile station is added to a group, it starts monitoring the group resource allocation MAP IE (404) to check for it's allocation. If a user's conditions change such that one or more of its parameters do not belong to the current group, then the user may be deleted from its current group (for example as described in reference to FIG. 12), and may be added to a new group via group configuration MAP IE (402).

MS's 504-518 may receive a plurality of bitmaps in a GRA IE of a MAP frame portion, may parse the bitmaps to identify a resource allocation and MIMO mode, wherein a pre-assigned position within a user bitmap to determine whether a mobile station is allocated frame resources and wherein the pre-assigned position to determine a MIMO mode from one or more MIMO bitmap(s), and may then access allocated frame resources.

Reference is made to FIGS. 6-11, which are schematic illustrations of example group resource allocation (GRA) information elements (IE) according to embodiments of the present invention. In some embodiments, bitmaps shown in one of FIGS. 6-11 may be used in conjunction with bitmaps shown in other of FIGS. 6-11, for example bitmaps 610 and 1208 may be used in a same embodiment.

Figure 6:
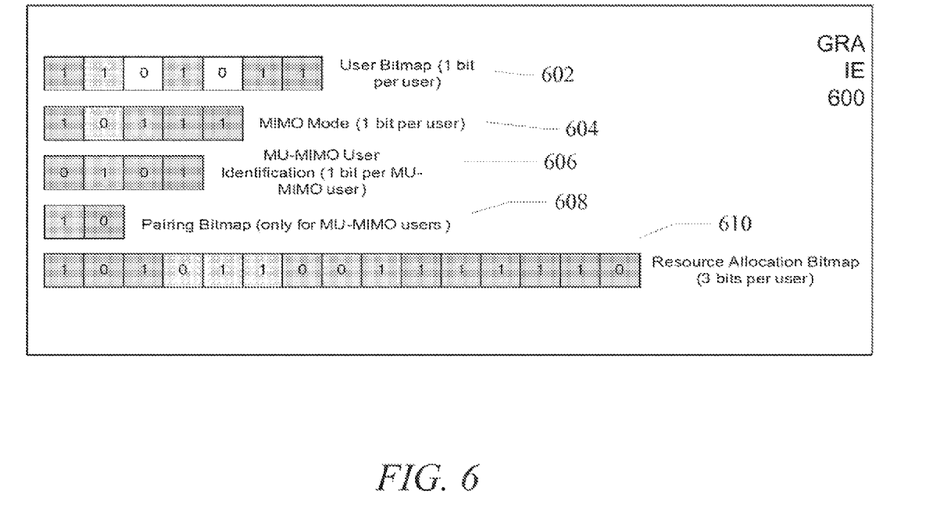
FIGS. 6-11 are schematic illustrations of example group resource allocation (GRA) information elements (IE) according to embodiments of the present invention.

In FIG. 6, GRA IE 600 includes user bitmap 602, MIMO mode bitmap 604, MU-MIMO ID bitmap 600, pairing bitmap 608 and resource allocation bitmap 610. User bitmap 602 uses 1 bit per user to signal whether the user is scheduled in the group in that frame/subframe or not. For all the scheduled users, MIMO mode bitmap 604 signals the MIMO mode, i.e. whether the user is using SU-MIMO or MU-MIMO. The MU-MIMO ID bitmap 606 and pairing bitmap 608 signal the pairing information for MU-MIMO users. MU-MIMO ID bitmap 606 indicates which users are allocated at their original positions in the bitmap (called User A), and which users are paired with another user at the other user's location (called User B). The number of bits per pair in pairing bitmap 608 depends on the total number of pairs in the group. If there are n pairs in the group, the number of bits per pair is p=ceil[log 2(n)]. The User A's are assigned an index starting from 0 to n−1 in the same order in which they appear in the bitmap. Every p bits in the pairing bitmap are assigned to each User B in the same order in which they appear in the PSI Bitmap. These p bits carry the index of User A that is paired with corresponding User B.

In this example, BS 502 group users with SU-MIMO rank 1 and MU-MIMO in the same group because 802.16m requires dynamic switching to be possible between these modes and may assign the seven bits shown, in user bitmap 602 to MS's 504-516, respectively, for example. In this example, user bitmap 602 indicates MS's 508 and 512 are not allocated resources, MIMO bitmap 604 indicates MS 500 is using SU-MIMO, MU-MIMO ID bitmap 606 indicates that MS's 504 and 514 are user A's, and bitmap 608 indicates that MS's 516 and 510 are paired with MS's 504 and 514, respectively.

Figure 7:
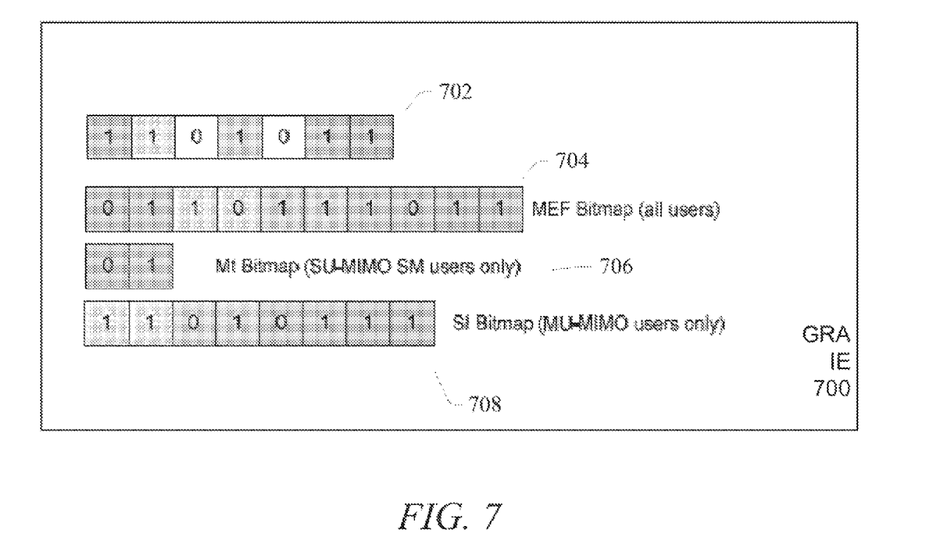

In FIG. 7, GRA IE 700 includes user bitmap 702, MIMO encoder format (MEF) bitmap 704, number of streams (Mt) bitmap 706, and stream indicator (SI) bitmap 708. In this example the MEF parameter needs to be specified for all users and tells which encoding the user is using. This parameter also specifies whether the user is using SU-MIMO or MU-MIMO. The values of MEF are: 00—SFBC (SU-MIMO); 01—Vertical encoding (SU-MIMO); and 10—Horizontal encoding (MU-MIMO). The value of Mt is always fixed to 1 for MU-MIMO and to 2 for SU-MIMO SFBC user's. Hence it needs to be specified only for SU-MIMO SM users. Similarly, SI is not needed for SU-MIMO and is specified only for MU-MIMO users. The values of Mt and SI cars each vary from 1 to 8 depending on the number of transmit antennas (Nt). This example assumes Nt to be 4.

MEF is signaled using 2 bits and we see that one value (11) is available and to simplify MU-MIMO pairing, horizontal encoding may be broken down into: 10—Horizontal encoding: user allocated at his original position according to bitmap; and 11—Horizontal encoding: user paired with another user at the other user's location MIMO Bitmap(s) Depending on the MIMO mode used by the MS (SU-MIMO vs MU-MIMO SFBC vs SM), different MIMO parameters may need to be signaled. The different parameters can be signaled using separate bitmaps or a common bitmap for all parameters.

Figure 8:
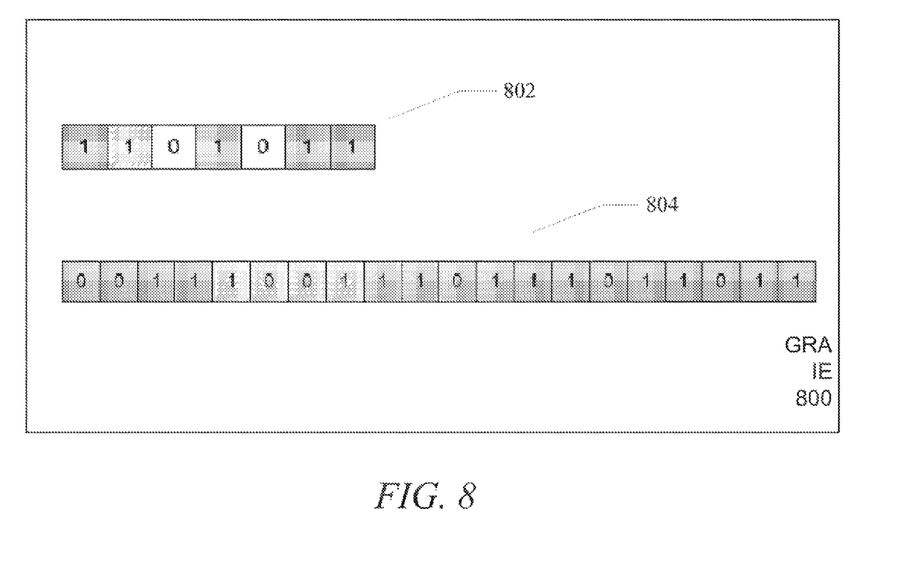

In FIG. 8, GRA IE 800 includes user bitmap 802 and MIMO bitmap 804, MIMO bitmap 804 may include MEF bitmap 704, Mt bitmap 706, and SI bitmap 708 in a single bitmap with four bits per scheduled mobile station (i.e. mobile stations allocated resources).

Figure 9:
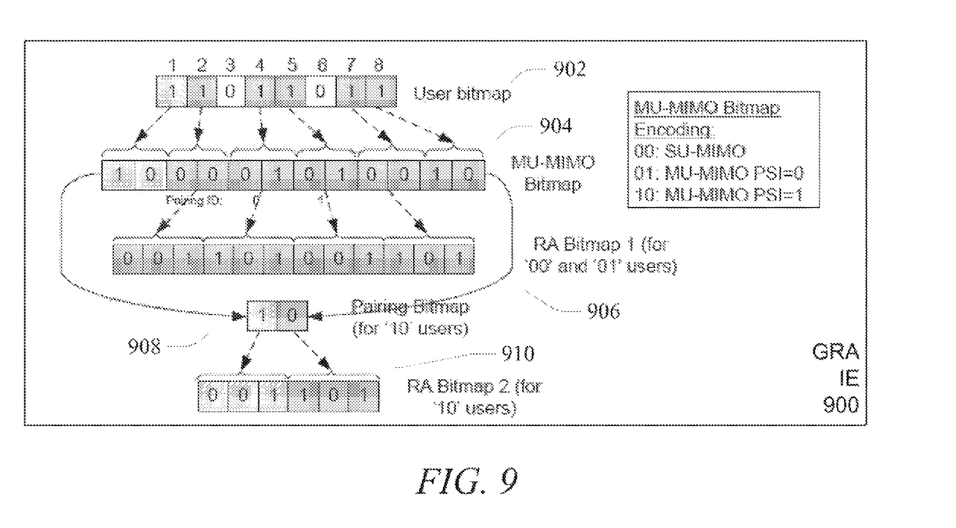

In FIG. 9, GRA IE 900 includes user bitmap 902, MU-MIMO bitmap 904, first RA bitmap 906, pairing bitmap 908 and second RA bitmap 910. User bitmap 902 uses 1 bit per user to signal whether the user is provided an allocation in the corresponding frame or not. MU-MIMO bitmap 904 signals the MIMO mode using 2 bits for every scheduled user in the group. The interpretation of the 2-bit MIMO mode is as follows: 00—SU-MIMO; 01—MU-MIMO PSI=0; 10—MU-MIMO PSI=1; and 11—reserved, where PSI is the pilot stream index of the MU-MIMO user. In this example only 2 pilot streams are used. The present invention is, however, extensible to the case where more than 2 pilot streams are used. The value of PSI signals whether the user is allocated as per its original position in the group (PSI=0), or if the user is paired with another user at the other users' position in the group (PSI=1). Thus, a PSI=1 user will be paired with a PSI=0 user. First RA bitmap 906 is for users with MIMO modes '00' and '01' and uses n bits per user to signal the resource allocation information (e.g. burst size and resource size). The pth user in the RA bitmap determines the location of its resources with respect to a group's starting location by adding up the resources of users 1 to p-1 in first RA bitmap 906.

Assuming MU-MIMO user pair k has user k(0) with PSI=0 and user k(1) with PSI=1, pairing bitmap 908 helps user k(1) determine the position, p, of user k(0) in first RA bitmap 906. Since the resource location of user k(1) is the same as resource location of user k(0), the user k(1) can determine this location by adding up the resources needed by users 1 to p-1 in first RA bitmap 906. User k(1) cart determine the remaining resource allocation parameters (burst size and resource size) from second RA-bitmap 910.

Figure 10:
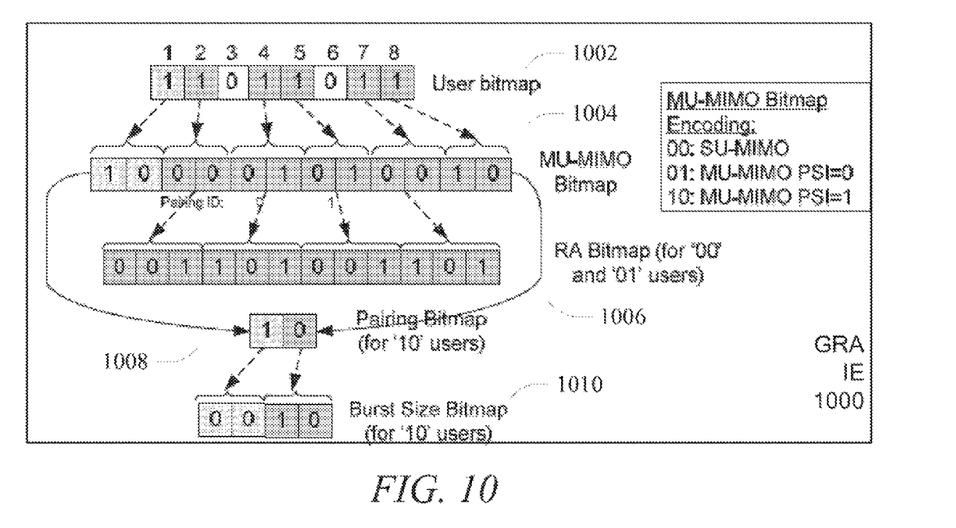

In FIG. 10, GRA IE 1000 includes user bitmap 1002, MU-MIMO bitmap 1004, RA bitmap 1006, pairing bitmap 1008 and burst size bitmap 1010. In this example, bitmaps 1002-1008 are the same as bitmaps 902-908, respectively. Instead of second RA bitmap 910, however, GRA IE 1000 includes burst size bitmap 1010, which takes advantage of the fact that the resource size is the same for the users of a MU-MIMO pair. Thus when user k(1) determines that it is paired with user k(0) at position p in RA bitmap 1006, it can then not only determine the locations of its resources, but also the resource size by decoding the bits corresponding to position p in RA bitmap 1006. Thus burst size bitmap 1010 needs to signal only the burst size and not the resource size.

Figure 11:
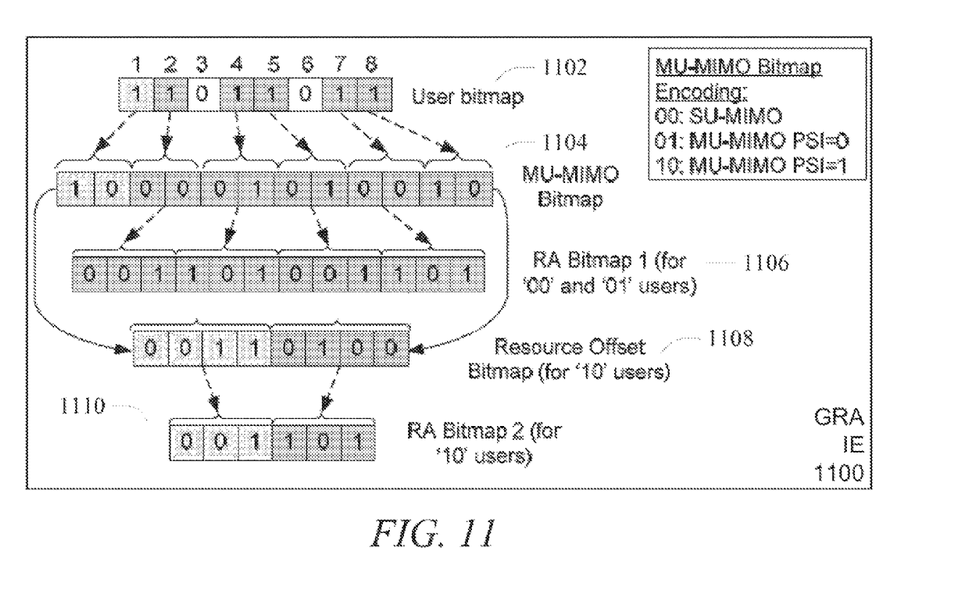

In FIG. 11, GRA IE 1100 includes user bitmap 1102, MU-MIMO bitmap 104, first RA bitmap 1106, resource offset bitmap 1108 and second RA bitmap 1110. In this example, bitmaps 1102-1106 are the same as bitmaps 902-906, respectively. Instead of pairing bitmap 908, however, GRA IE 1100 includes, in order to avoid excessive processing on some mobile stations, resource offset bitmap 1108. Resource offset bitmap 1108 provides direct information about the resource location information of k(1) users, eliminating the need for these users to determine the user that they are paired with and then determine their resource location by adding up resource sizes of users from first RA Bitmap 1106. Resource offset bitmap 1108 is followed by second RA bitmap 1110 to signal the burst size and resource size information for k(1) users.

Figure 12:
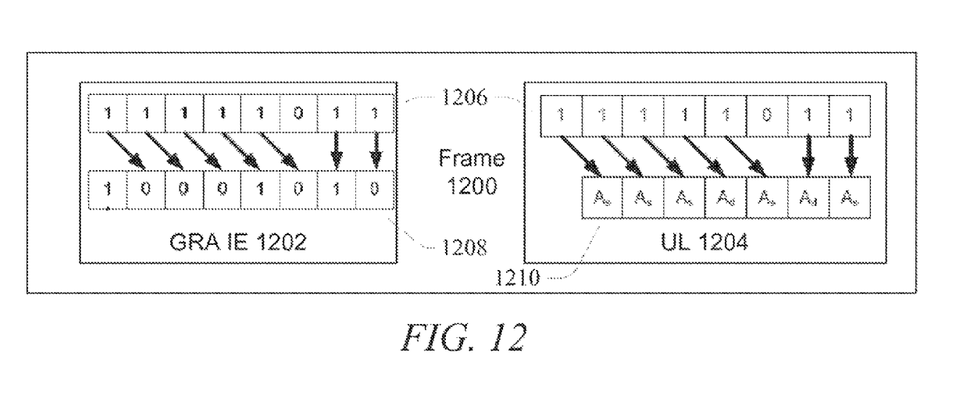
FIG. 12 is a schematic illustration of an example frame according to an embodiment of the present invention.

Reference is made to FIG. 12, which is a schematic illustration of an example frame according to an embodiment of the present invention. In the case where BS 502 needs to delete a MS from a group, for example because of a parameter change. BS 502 may utilize frame 1200 which includes user bitmap 1206 and deletion bitmap 1208 in GRA IE 1202 and acknowledgement (ACK) channel 1210 in uplink 1204. In this example, the use of user bitmap 1206 is different than prior examples. If a bit is set to 1 in user bitmap 1206, it signals either a scheduled user or a deleted user. The first bit in deletion bitmap 1208 signals whether there are any users deleted from the group. If this bit is set to 1, the rest of the bits in deletion bitmap 1208 follow, otherwise the remaining bits are skipped, saving overhead. The number of remaining bits in deletion bitmap 1208 is equal to the number of 1's in user bitmap 1206. A MS is considered to be deleted if the corresponding bit in the deletion bitmap is set to 1. In the case where the 8 bits in user bitmap 1206 correspond to MS's 504-518, respectively, user bitmap 1206 indicates that MS 514 is not scheduled (and the remaining MS's are either scheduled or deleted). The first bit of deletion bitmap 1208 indicates that at least one user is deleted from the group. The remaining two set bits in deletion bitmap 1208 indicate that MS 510 and MS 516 are deleted from the group.

It is important for a deleted MS to send acknowledgement (ACK) to the BS for the deletion information so that the BS can assign other MS to the group in its place. Conventionally, the assignment of an ACK channel for this control information is performed separate from assignment of the ACK channel for data and hence causes more overhead. In the current mechanism, the data allocations for all scheduled MS's are acknowledged using allocated contiguous resources and the starting ACK resource is signaled. In ACK channel 1210, however, the ACK resources for scheduled and deleted MS's are contiguous and in the order of the MS's positions in the group. Thus there is no need to signal the resource information separately for deleted users, saving overhead and keeping the mechanism simple. In this example, MS 510 and MS 516 would acknowledge deletion contiguous with acknowledgments of the scheduled MS's.

Figure 13:
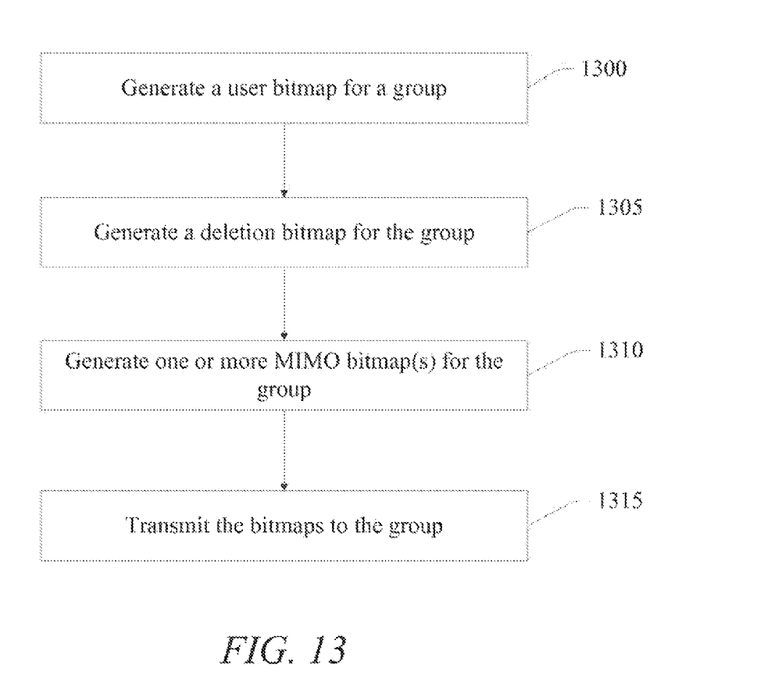
FIG. 13 is a flow chart of a method, according to an embodiment of the present invention.

Reference is made to FIG. 13, which is a flow chart of a method according to an embodiment of the present invention. In operation 1300, BS 502 may generate a user bitmap for a group of MS's as part of GRA scheduling. In one embodiment, the user bitmap may indicate MS's allocated resources in a frame. In another embodiment, the user bitmap may indicate MS's either allocated resources in a frame or deleted from the group (e.g., user bitmap 1200).

In operation 1305, BS 502 may generate a deletion bitmap for the group. In one embodiment, where there are no users deleted from the group the deletion bitmap may include a single bit set to zero. In another embodiment, where there are users deleted from the group the first bit of the deletion bitmap is set to one.

In operation 1310, BS 502 may generate one or more MIMO bitmap(s) to indicate to scheduled MS's their respective MIMO mode. BS 502 may utilize any one of or any combination of the bitmaps presented above.

In operation 1315, BS 502 may transmit the generated bitmaps in a GRA IE within a MAP portion of a frame.

Figure 14:
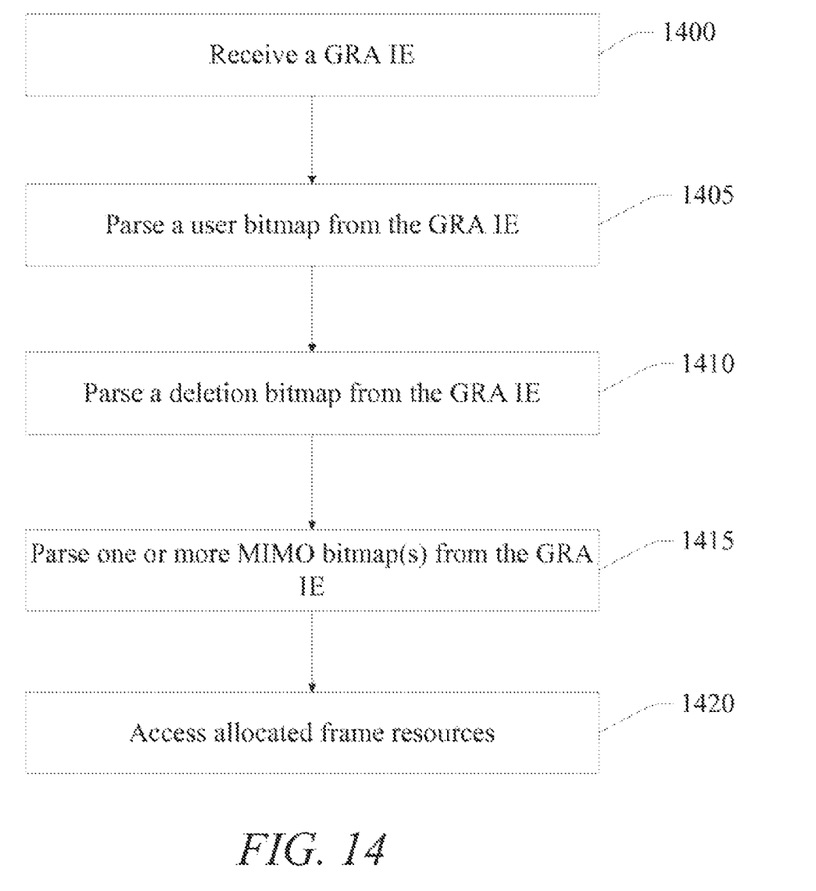
FIG. 14 is a flow chart of a method according to an embodiment of the present invention.

Reference is made to FIG. 14, which is a flow chart of a method according to an embodiment of the present invention. In operation 1400, a MS (e.g., 504-518) may receive a GRA IE, for example any one of or any combination of GRA IE's presented above.

In operation 1405, the MB may parse a user bitmap from, the GRA IE. In one embodiment, the MS uses a group index or position previously communicated in a group configuration IE (e.g., 402) to determine if the MS is scheduled (or deleted, in some embodiments).

In operation 1410, the MS may parse a deletion bitmap from the GRA IE (e.g., deletion bitmap 1208). In one embodiment, the MS uses its position in the user bitmap to determine from the deletion bitmap whether the MS is deleted.

In operation 1415, the MS may parse one or more MIMO bitmap(s) from the GRA IE, if scheduled, to determine a MIMO mode. In various embodiments, any one of or any combination of MIMO bitmaps presented above are utilized.

In operation 1420, the MS may access allocated frame resources. In one embodiment, where the MS is deleted from the group, the MS would send an ACK within a continuous ACK channel for scheduled and deleted users. In one embodiment, where the MS is scheduled, the MS may access uplink and/or downlink within a frame (e.g., frame 300).

Figure 15:
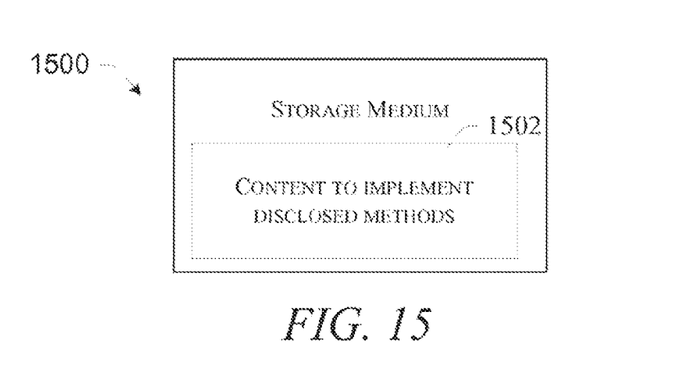
FIG. 15 is a block diagram of an example storage medium including content which, when accessed by a device, causes the device to implement one or more aspects of one or more embodiment(s) of the invention.

Reference is made to FIG. 15, which is a block diagram of an example storage medium including content which, when accessed by a device, causes the device to implement one or more aspects of one or more embodiment(s) of the invention. In this regard, storage medium 1500 includes content 1502

(e.g., instructions, data, or any combination thereof) which, when executed, causes the system to implement one or more aspects of methods described above.

The machine-readable (storage) medium 1500 may include, but is not limited to, floppy diskettes, optical disks, CD-ROMs, and magneto-optical disks, ROMs, Rams, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem, radio or network connection).

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by skilled in the art that the appended claims are intended to cover all such modifications and changes as fall within the true spirit of the invention.

The invention claimed is:

1. A non-transitory computer readable storage medium including instructions stored thereon, which when executed by an accessing device cause the accessing device to perform operations to:
generate a plurality of bitmaps to identify resource allocations, multiple input multiple output (MIMO) modes and deletion for a group of broadband wireless mobile stations, wherein each mobile station in the group is assigned a position within a user bitmap to identify whether the mobile station is allocated frame resources, wherein the position within one or more MIMO bitmap(s) to identify a MIMO mode and wherein the position within a deletion bitmap to identify whether the mobile station is deleted from the group; and
transmit the bitmaps in a group resource allocation (GRA) information element (IE) of a broadband wireless media access protocol (MAP) frame portion.

2. The non-transitory computer readable storage medium of claim 1, wherein the MIMO bitmap(s) comprise a MIMO bitmap with one bit per mobile station allocated resources to indicate whether the mobile stations allocated resources are allocated in single user (SU) MIMO mode or multiuser (MU) MIMO mode, and a MU-MIMO bitmap with one bit per MU-MIMO assigned mobile station to indicate whether the MU-MIMO assigned mobile stations are paired at their current location or at the location of another mobile station.

3. The non-transitory computer readable storage medium of claim 1, wherein the MIMO bitmap(s) comprise a MIMO bitmap with four bits per mobile station allocated resources to indicate whether the mobile stations allocated resources are allocated in single user (SU) MIMO mode or multiuser (MU) MIMO mode as well as a number of streams for SU-MIMO assigned mobile stations and a stream indicator for MU-MIMO assigned mobile stations.

4. The non-transitory computer readable storage medium of claim 1, wherein the MIMO bitmap(s) comprise a MIMO bitmap with two bits per mobile station allocated resources to indicate whether the mobile stations allocated resources are allocated in single user (SU) MIMO mode or multiuser (MU) MIMO first mode, wherein the mobile station is allocated resources at a same bitmap location, or MU-MIMO second mode, wherein the mobile stations is paired with resources at mobile station's bitmap location.

5. The non-transitory computer readable storage medium of claim 4, further comprising a pairing bitmap to indicate to MU-MIMO mobile stations paired to another mobile stations' location an index of the mobile station with which it is paired.

6. The non-transitory computer readable storage medium of claim 4, further comprising a resource offset bitmap to indicate to MU-MIMO mobile stations paired to another mobile stations' location a direct resource location.

7. A system comprising:
a receiver to receive a plurality of bitmaps in a group resource allocation (GRA) information element (IE) of a broadband wireless media access protocol (MAP) frame portion;
a processor to parse the bitmaps to identify a resource allocation and a multiple input multiple output (MIMO) mode, wherein a pre-assigned position within a user bitmap to determine whether a mobile station is allocated frame resources and wherein the pre-assigned position to determine a MIMO mode from one or more MIMO bitmap(s); and
multiple antenna to transmit allocated uplink in the MIMO mode.

8. The system of claim 7, wherein the MIMO bitmap(s) comprise a MIMO bitmap with one bit per mobile station allocated resources to indicate whether the mobile stations allocated resources are allocated in single user (SU) MIMO mode or multi-user (MU) MIMO mode, and a MU-MIMO bitmap with one bit per MU-MIMO assigned mobile station to indicate whether the MU-MIMO assigned mobile stations are paired at their current location or at the location of another mobile station.

9. The system of claim 7, wherein the MIMO bitmap(s) comprise a MIMO bitmap with two bits per mobile station allocated resources to indicate whether the mobile stations allocated resources are allocated in single user (SU) MIMO mode or multi-user (MU) MIMO first mode, wherein the mobile station is allocated resources at a same bitmap location, or MU-MIMO second mode, wherein the mobile stations is paired with resources at mobile station's bitmap location.

10. The system of claim 7, wherein the MIMO bitmap(s) comprise a MIMO bitmap with four bits per mobile station allocated resources to indicate whether the mobile stations allocated resources are allocated in single user (SU) MIMO mode or multi-user (MU) MIMO mode as well as a number of streams for SU-MIMO assigned mobile stations and a stream indicator for MU-MIMO assigned mobile stations.

11. The system of claim 10, further comprising a pairing bitmap to indicate to MU-MIMO mobile stations paired to another mobile stations' location an index of the mobile station with which it is paired.

12. The system of claim 10, further comprising a resource offset bitmap to indicate to MU-MIMO mobile stations paired to another mobile stations' location a direct resource location.

13. A non-transitory computer readable storage medium including instructions stored thereon, which when executed by an accessing device cause the accessing device to perform operations to:
receive a plurality of bitmaps in a group resource allocation (GRA) information element (IE) of a broadband wireless media access protocol (MAP) frame portion;

parse the bitmaps to identify a resource allocation, a multiple input multiple output (MIMO) mode and a deletion status, wherein a pre-assigned position within a user bitmap to determine whether a mobile station is allocated frame resources, wherein the pre-assigned position to determine a MIMO mode from one or more MIMO bitmap(s), and the pre-assigned position to determine whether the mobile station is deleted from a group; and access allocated frame resources.

14. The non-transitory computer readable storage medium of claim 13, wherein the MIMO bitmap(s) comprise a MIMO bitmap with one bit per mobile station allocated resources to indicate whether the mobile stations allocated resources are allocated in single user (SU) MIMO mode or multiuser (MU) MIMO mode, and a MU-MIMO bitmap with one bit per MU-MIMO assigned mobile station to indicate whether the MU-MIMO assigned mobile stations are paired at their current location or at the location of another mobile station.

15. The non-transitory computer readable storage medium of claim 13, wherein the MIMO bitmap(s) comprise a MIMO bitmap with four bits per mobile station allocated resources to indicate whether the mobile stations allocated resources are allocated in single user (SU) MIMO mode or multiuser (MU) MIMO mode as well as a number of streams for SU-MIMO assigned mobile stations and a stream indicator for MU-MIMO assigned mobile stations.

16. The non-transitory computer readable storage medium of claim 13, wherein the MIMO bitmap(s) comprise a MIMO bitmap with two bits per mobile station allocated resources to indicate whether the mobile stations allocated resources are allocated in single user (SU) MIMO mode or multiuser (MU) MIMO first mode, wherein the mobile station is allocated resources at a same bitmap location, or MU-MIMO second mode, wherein the mobile stations is paired with resources at mobile station's bitmap location.

17. The non-transitory computer readable storage medium of claim 16, further comprising a pairing bitmap to indicate to MU-MIMO mobile stations paired to another mobile stations' location an index of the mobile station with which it is paired.

18. The non-transitory computer readable storage medium of claim 16, further comprising a resource offset bitmap to indicate to MU-MIMO mobile stations paired to another mobile stations' location a direct resource location.

* * * * *

UNITED STATES PATENT AND TRADEMARK OFFICE
CERTIFICATE OF CORRECTION

PATENT NO. : 9,036,728 B2
APPLICATION NO. : 13/735905
DATED : May 19, 2015
INVENTOR(S) : Shrivastava et al.

It is certified that error appears in the above-identified patent and that said Letters Patent is hereby corrected as shown below:

Claims

In column 12, line 6-7, in Claim 5, delete "stations'" and insert --station's--, therefor In column 12, line 12, in Claim 6, delete "stations'" and insert --station's--, therefor

In column 12, line 55, in Claim 11, delete "stations'" and insert --station's--, therefor In column 12, line 59, in Claim 12, delete "stations'" and insert --station's--, therefor In column 14, line 16-17, in Claim 17, delete "stations'" and insert --station's--, therefor In column 14, line 22, in Claim 18, delete "stations'" and insert --station's--, therefor Signed and Sealed this
Twenty-first Day of June, 2016

Michelle K. Lee
*Director of the United States Patent and Trademark Office*